United States Patent
Oh

(10) Patent No.: US 10,013,225 B2
(45) Date of Patent: Jul. 3, 2018

(54) IMAGE FORMING APPARATUS AND IMAGE FORMING METHOD THEREOF TO GENERATE BINARY PRINT DATA EXTERNAL HOST APPARATUS

(71) Applicant: S-PRINTING SOLUTION CO., LTD., Suwon-si, Gyeonggi-do (KR)

(72) Inventor: Han-sang Oh, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/073,108

(22) Filed: Nov. 6, 2013

(65) Prior Publication Data

US 2014/0132986 A1 May 15, 2014

(30) Foreign Application Priority Data

Nov. 12, 2012 (KR) .................. 10-2012-0127705

(51) Int. Cl.
*G06F 3/12* (2006.01)
*H04N 1/407* (2006.01)
*H04N 1/60* (2006.01)

(52) U.S. Cl.
CPC ......... *G06F 3/1293* (2013.01); *H04N 1/4078* (2013.01); *H04N 1/6033* (2013.01)

(58) Field of Classification Search
CPC ........... G03G 15/5058; G03G 15/5062; G03G 15/5041; G03G 2215/00059; G03G 2215/00042; G03G 15/01; G03G 15/50; G03G 15/5025; G03G 15/5033; G03G 15/5054; G03G 15/5075; G03G 15/5087; G03G 2215/00063; G03G 2215/00029; G03G 2215/00037; G03G 2215/00071; G03G 2215/00084; G03G 2215/00109; G03G 2215/0164; G03G 2215/0187; G03G 2215/0429; H04N 1/60; H04N 1/4078; H04N 1/409; H04N 1/405; H04N 1/407; H04N 1/40018; H04N 1/40068; H04N 1/58; H04N 1/52; H04N 1/6002; H04N 1/6011;

(Continued)

(56) References Cited

U.S. PATENT DOCUMENTS 5,345,315 A 9/1994 Shalit
6,771,912 B1 * 8/2004 Mo et al. .................. 399/46

(Continued)

FOREIGN PATENT DOCUMENTS

EP 0 838 941 A2 4/1998

OTHER PUBLICATIONS

Mestha et al., "Gray Balance Control Loop for Digital Color Printing Systems", 21$^{st}$ International Conference on Digital Printing Technologies, ResearchGate, Sep. 30, 2005, pp. 1-7.

(Continued)

*Primary Examiner* — Jonathan R Beckley
(74) *Attorney, Agent, or Firm* — Staas & Halsey LLP

(57) ABSTRACT

An image forming method of a GDI image forming apparatus includes forming an image density pattern for tone compensation, measuring an image density of the formed image density pattern for tone compensation, and transmitting measured image density data of the image density pattern for tone compensation to a host apparatus communicating with the image forming apparatus.

16 Claims, 8 Drawing Sheets

(58) Field of Classification Search
CPC ...... H04N 1/6013; H04N 1/6027; H04N 1/56; H04N 1/46; H04N 1/6052; H04N 1/6055; H04N 1/6033; H04N 1/6041; H04N 1/603; H04N 1/6075; H04N 1/6083; H04N 1/6091; H04N 1/64; H04N 1/6016; H04N 1/6019; G06F 3/1293
USPC ........... 358/1.9, 3.01, 3.03, 3.06, 3.04, 3.05, 358/3.07, 3.08, 3.09, 3.1, 3.13, 3.14, 3.21, 358/3.23, 3.24, 3.27, 3.26, 3.3, 504, 518, 358/524, 525, 534, 536; 382/162, 165, 382/167, 168, 169, 170, 237, 232, 254, 382/260, 264, 270, 274, 276, 302; 708/290, 847; 341/56
See application file for complete search history.

(56) References Cited

U.S. PATENT DOCUMENTS

| | | | | |
|---|---|---|---|---|
| 6,885,474 | B2 * | 4/2005 | Kimura | .......................... 358/1.9 |
| 6,898,381 | B2 * | 5/2005 | Maebashi | .............. G03G 15/01 399/15 |
| 7,127,187 | B2 * | 10/2006 | Mo | .................... G03G 15/5041 399/46 |
| 7,161,718 | B2 * | 1/2007 | Kise | ........................ H04N 1/00 358/1.13 |
| 7,355,748 | B2 * | 4/2008 | Arai et al. | ..................... 358/1.9 |
| 7,453,609 | B2 * | 11/2008 | Itagaki | .......................... 358/518 |
| 7,898,689 | B2 * | 3/2011 | Mori | ........................ H04N 1/60 358/1.1 |
| 8,019,152 | B2 * | 9/2011 | Harigai | .............. G03G 15/0131 358/1.1 |
| 8,384,950 | B2 * | 2/2013 | Kuwahara | ................ B41J 29/02 347/12 |
| 8,437,040 | B2 * | 5/2013 | Taylor | .................. H04N 1/4078 358/1.9 |
| 8,559,031 | B2 * | 10/2013 | Nishikawa | ......... G03G 15/5058 358/1.13 |
| 9,069,505 | B2 * | 6/2015 | Nishikawa | ............ G06F 3/1211 |
| 2009/0213434 | A1 | 8/2009 | Ito et al. | |
| 2012/0086983 | A1 * | 4/2012 | Taylor et al. | ................. 358/3.01 |

OTHER PUBLICATIONS

Extended European Search Report dated Sep. 26, 2016 in corresponding European Patent Application No. 13192217.1.

* cited by examiner

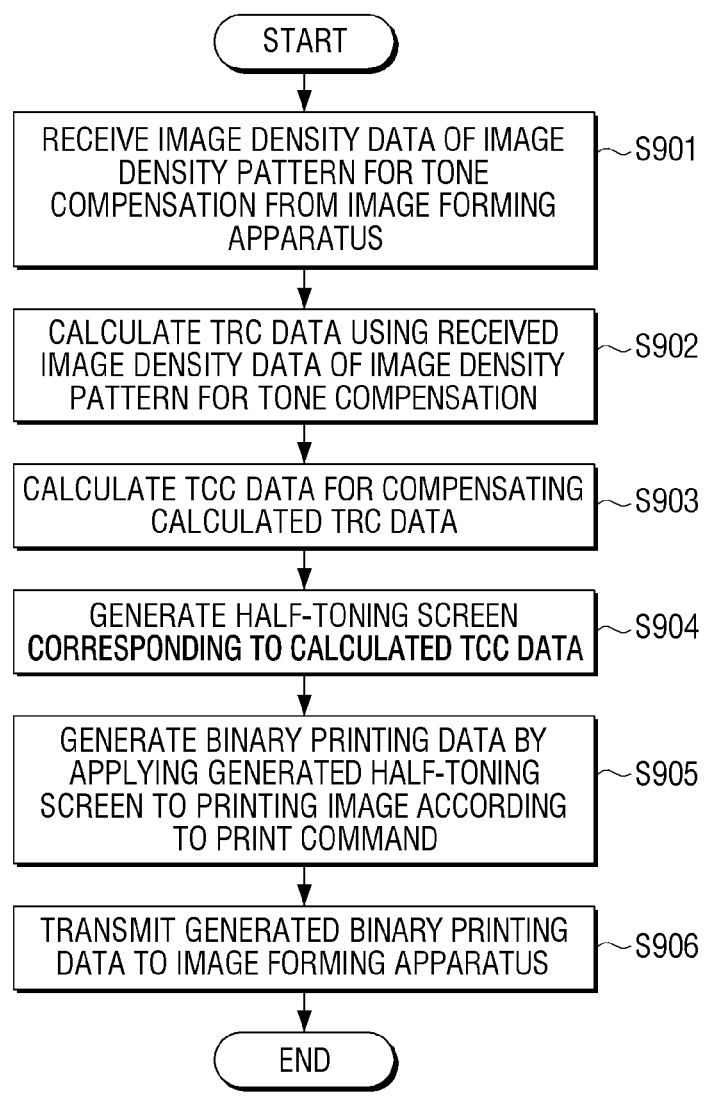

IMAGE FORMING APPARATUS AND IMAGE FORMING METHOD THEREOF TO GENERATE BINARY PRINT DATA EXTERNAL HOST APPARATUS

CROSS-REFERENCE TO RELATED APPLICATIONS

This application claims the benefit of priority under 35 U.S.C. § 119 from Korean Patent Application No. 10-2012-0127705, filed on Nov. 12, 2012, in the Korean Intellectual Property Office, the disclosure of which is incorporated herein by reference in its entirety.

BACKGROUND OF THE INVENTION

1. Field of the Invention

Apparatuses and methods consistent with exemplary embodiments relate to an image forming apparatus and an image forming method thereof, a host apparatus and an image-forming control method thereof, an image forming method of an image forming system, and more particularly, to an image forming apparatus and an image forming method thereof, a host apparatus and an image-forming control method thereof, an image forming method of an image forming system, which control an image density in a system using a graphic device interface (GDI) type image forming apparatus.

2. Description of the Related Art

In general, an image forming apparatus is an apparatus which prints printing data generated in a terminal apparatus, such as a computer, onto a recording medium, such as paper. As an example of the image forming apparatuses, there are copiers, printers, facsimiles, multiple function peripherals (MFPs) configured to implement multiple functions thereof through one apparatus.

Recently, laser image forming apparatuses have been gradually increasing in use, as they have remarkably superior effects in terms of print quality, print speed, noise in printing, and the like as compared with dot image forming apparatuses or inkjet image forming apparatuses which are currently mainly used. The laser image forming apparatuses denote an image forming apparatus using the principle of sequentially coating toner on an organic photo conductor (OPC) using a laser beam modulated into a picture signal, transferring the toner coated on a surface of the OPC onto a printing paper, and fusing the toner on the printing paper with high temperature and pressure.

In particular, in recent years, color laser image forming apparatuses which implement color images using a laser manner have also spread. The color laser image forming apparatuses typically represent the color images using four colors of toners, that is, cyan (C), magenta (M), yellow (Y), and black (K).

The color laser image forming apparatuses are divided into single path type image forming apparatuses that include four scanning units and four OPCs, and multipath type image forming apparatuses that include one scanning unit and one OPC.

In the single path type, the time required for color printing is equal to the time required for black and white printing. Therefore, the single path type is mainly used in the high-speed color laser image forming apparatuses. However, the single path type of color laser image forming apparatuses require four scanning units and four OPCs and thus become expensive. Thus, low speed color laser image forming apparatuses, which include one scanning unit and one OPC, employ the multipath type of repeatedly writing, developing, and transferring each color to form a color toner image on an intermediate transfer belt and transferring and fusing the color toner image on a paper.

On the other hand, in the color laser image forming apparatuses, image densities of yellow (Y), magenta (M), cyan (C), and black (K) may change due to several factors, such as for example, changes in environments such as temperature or humidity, changes over time in consumables including developers, and changes in development-related voltages. Color of an output image may consequently change due to changes in the image density and thus the desired color of image is not produced. Therefore, there is a need for suitably controlling the image density according to the change in the image density.

As a first method of controlling an image density in the related art, the color laser image forming apparatus autonomously forms image density patterns for four colors—C, M, Y, and K—on an intermediate transfer belt, measures reflectance using the image density (ID) sensor, and performs an electro-photography (EP) condition compensation to control an amount of toner attached on an OPC by changing a high voltage used in an EP process. In a second method, image density compensation for an intermediate gradation to change a tone reproduction curve (TRC) is handled via changes in a half-toning screen.

However, in the GDI type image forming apparatus, since a host apparatus generates binary printing data to which the half-toning screen is applied and transmits the generated binary printing data to the image forming apparatus, the image forming apparatus autonomously disables compensation for an image density of an intermediate gradation to change a TRC through changes in a half-toning screen. Therefore, the GDI type image forming apparatus only performs the EP condition compensation as the first method and thus, actively disables the compensation for the image density of the intermediate gradation. The maintenance of the image density of the intermediate gradation, reproduction of contrast characteristics and color become difficult.

In particular, when photos largely using the intermediate gradation or graphic texts are printed, color reproduction becomes difficult.

SUMMARY OF THE INVENTION

One or more exemplary embodiments provide an image forming apparatus and an image forming method thereof, a host apparatus and an image-forming control method thereof, an image forming method of an image forming system, which are capable of compensating a TRC in a system using a GDI type image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming method of a graphic device interface (GDI) type image forming apparatus. The method may include forming an image density pattern for tone compensation, measuring an image density of the formed image density pattern for tone compensation, and transmitting measured image density data of the image density pattern for tone compensation to a host apparatus communicating with the image forming apparatus.

The method may further include, when the host apparatus generates tone-compensated binary printing data based on the transmitted image density data, receiving the generated binary printing data; and performing an image forming job using the received binary printing data.

The method may further include forming an image density pattern for electro-photography (EP) condition compensation, measuring an image density of the formed image density pattern for EP condition compensation, and compensating an EP condition using the measured image density of the image density pattern for EP condition compensation. The image density pattern for tone compensation may be formed by reflecting an EP condition compensation result.

Each of the image density pattern for tone compensation and the image density pattern for EP condition compensation may include an image density pattern of yellow (Y), an image density pattern of magenta (M), an image density pattern of cyan (C), and an image density pattern of black (K).

Each of the measuring of an image density of the formed image density pattern for tone compensation and the measuring of an image density of the formed image density pattern for EP condition compensation may include measuring the image density of the image density pattern formed in an intermediate transfer belt using an image density sensor.

The compensating an EP condition may include comparing the measured image density of the image density pattern for EP condition compensation with a preset reference image density, and compensating at least one of an electric charge voltage condition, a developing bias voltage condition, or a writing condition using a comparison result.

The foregoing and/or other features and utilities of the present general inventive concept may also be achieved by providing an image-forming control method of a host apparatus communicating with a graphic device interface (GDI) type image forming apparatus. The method may include receiving image density data of an image density pattern for tone compensation from the image forming apparatus, calculating tone reproduction curve (TRC) data corresponding to the received image density data of the image density pattern for tone compensation; calculating tone compensation curve (TCC) data for compensating for the calculated TRC data, generating a half-toning screen corresponding to the calculated TCC data, generating binary printing data by applying the generated half-toning screen to a printing image according to a print command, and transmitting the generated binary printing data to the image forming apparatus.

The method may further include smoothing the calculated TRC data. The calculating TCC data may include calculating the TCC data using the smoothed TRC data.

The method may further include performing interpolation on the calculated TRC data. The calculating TCC data may include calculating the TCC data using the interpolated TRC data.

The foregoing and/or other features and utilities of the present general inventive concept may also be achieved by providing a graphic device interface (GDI) type image forming apparatus. The image forming apparatus may include a communication unit, an image forming unit configured to form an image density pattern for tone compensation, an image density measuring unit configured to measure an image density of the formed image density pattern for tone compensation, and a controller configured to control the communication unit to transmit measured image density data of the image density pattern for tone compensation to a host apparatus communicating with the image forming apparatus.

The controller may, when tone-compensated binary printing data based on the transmitted image density data is generated in the host apparatus and received through the communication unit, control the image forming unit to perform an image forming job using the received binary printing data.

The image forming unit may form an image density pattern for electro-photography (EP) condition compensation. The image density measuring unit may measure an image density of the formed image density pattern for EP condition compensation. The controller may compensate an EP condition using the measured image density of the image density pattern for EP condition compensation. The image forming unit may form the image density pattern for tone compensation by reflecting an EP condition compensation result.

Each of the image density pattern for tone compensation and the image density pattern for EP condition compensation may include an image density pattern of yellow (Y), an image density pattern of magenta (M), an image density pattern of cyan (C), and an image density pattern of black (K).

The image density measuring unit may measure the image density of the image density pattern formed in an intermediate transfer belt using an ID sensor.

The controller may compare the measured image density of the image density pattern for EP condition compensation with a preset reference image density and compensate at least one of an electric charge voltage condition, a developing bias voltage condition, or a writing condition using a comparison result.

The foregoing and/or other features and utilities of the present general inventive concept may also be achieved by providing a host apparatus which communicates with a graphic device interface (GDI) type image forming apparatus. The host apparatus may include a communication unit configured to receive image density data of an image density pattern for tone compensation from the image forming apparatus, a driver configured to calculate tone reproduction curve (TRC) data corresponding to the received image density data of the image density pattern for tone compensation, calculate tone compensation curve (TCC) data for compensating the calculated TRC data, generate a half-toning screen corresponding to the calculated TCC data, and generate binary printing data by applying the generated half-toning screen to a printing image according to a print command, and a controller configured to control the communication unit to transmit the generated binary printing data to the image forming apparatus.

The driver may smooth the calculated TRC data and calculate the TCC data using the smoothed TRC data.

The driver may perform interpolation on the calculated TRC data and calculate the TCC data using the interpolated TRC data.

The foregoing and/or other features and utilities of the present general inventive concept may also be achieved by providing an image forming method of an image forming system. The image forming method may include forming an image density pattern for tone compensation in an image forming apparatus, measuring an image density of the formed image density pattern for tone compensation in the image forming apparatus, transmitting measured image density data of the image density pattern for tone compensation from the image forming apparatus to a host apparatus communicating with the image forming apparatus, generating tone-compensated binary printing data based on the received image density data in the host apparatus, transmitting the generated binary printing data from the host apparatus to the image forming apparatus, and performing an image forming job in the image forming apparatus using the binary printing data transmitted from the host apparatus.

The foregoing and/or other features and utilities of the present general inventive concept may also be achieved by providing an image forming method of a graphic device interface (GDI) type image forming system. The image forming method may include forming an image density pattern for tone compensation in an image forming apparatus, measuring an image density of the formed image density pattern for tone compensation in the image forming apparatus, generating tone reproduction curve (TRC) data using the measured image density of the image density pattern for tone compensation in the image forming apparatus, transmitting the generated TRC data from the image forming apparatus to a host apparatus communicating with the image forming apparatus, calculating tone compensation curve (TCC) data for compensating the received TRC data in the host apparatus, generating a half-toning screen corresponding to the calculated TCC data in the host apparatus, generating binary printing data by applying the generated half-toning screen to a printing image according to a print command in the host apparatus, transmitting the generated binary printing data from the host apparatus to the image forming apparatus, and performing an image forming job using the received binary printing data in the image forming apparatus.

BRIEF DESCRIPTION OF THE DRAWINGS

The above and/or other features and utilities of the present general inventive concept will be more apparent by describing in detail exemplary embodiments, with reference to the accompanying drawings, in which:

FIG. 9 is a flowchart illustrating an image-forming control method of a host apparatus according to an exemplary embodiment of the present general inventive concept.

DETAILED DESCRIPTION OF THE PREFERRED EMBODIMENTS

Figure 1:
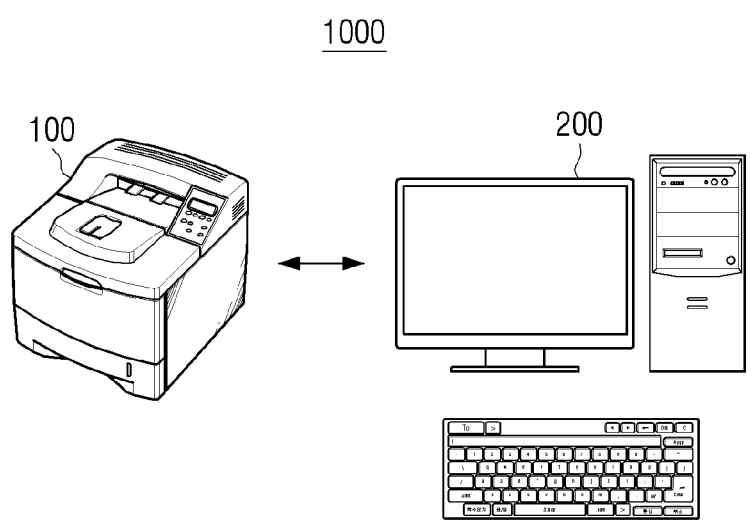
FIG. 1 is a view illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail. For clarity, a classification of image forming apparatuses according to printer language will be described before detailed description is made with reference to the accompanying drawings.

To perform a printing operation using an image forming apparatus, a driver of the host apparatus converts printing data into a printer language and provides the converted printer language to an image forming apparatus. Here, according to the provided printer language, the image forming apparatus may be classified into a page description language (PDL) type image forming apparatus or a graphic device interface (GDI) type image forming apparatus.

The PDL includes, for example, printer control language (PCL) 5, PCL 6, and PostScript (PS) and refers to a printer language for generating different commands according to objects. Since a PDL generates commands for objects, the PDL is advantageous when page output data, such as a text, a line, and a side, is small. When the page output data is large, output speed may be reduced.

The GDI language refers to a printer language for converting a page of printing data into binary printing data, which is bitmap data. Since a GDI language generates binary printing data, which is bitmap data in units of pages, the GDI language is more advantageous for improvement in output speed when the output data is large than when the output data is small. An example of the GDI language is the Samsung printer language (SPL) supported by Samsung Electronics Co. Ltd.

On the other hand, the image forming apparatus may perform a printing job using an emulator corresponding to the received printer language. For example, when the received printer language is PCL 6, the image forming apparatus may perform a printing job using a PCL 6 emulator.

In the disclosure, a tone reproduction curve (TRC) means a graph indicating relationship between an input gradation and an output gradation. The input gradation means gradation corresponding to an image density of an image density pattern to be formed and the output gradation means a gradation corresponding to an image density according to measurement of an image density of an image density pattern formed.

In the disclosure, a tone compensation curve (TCC) means a graph for compensating the TRC.

FIG. 1 is a view illustrating an image forming system 100 according to an exemplary embodiment. Referring to FIG. 1, the image forming system 1000 includes an image forming apparatus 100 and a host apparatus 200. Here, the image forming apparatus according to an exemplary embodiment may be, for example, a color laser image forming apparatus. Further, the image forming apparatus 100 may have a single path type or a multipath type. The image forming apparatus may be a GDI type image forming apparatus 100.

The image forming apparatus 100 may perform an image density control operation at a specific point in time. That is, the image density may change due to several factors, for example, changes in environments such as temperature or humidity, changes over time in consumables including developers, and changes in development-related voltages. Therefore, there is a need for suitably controlling the image density by measuring the image density periodically or at a specific point in time. Therefore, the image forming apparatus 100 may autonomously determine a periodic point in time (for example, whenever printing papers of 100 pieces are printed) or a specific point in time (for example, when power is turned on) and perform an image density control operation. Alternatively, when the host apparatus 200 orders the image forming apparatus 100 to perform the image density control operation, the image forming apparatus 100 may perform the image density control operation.

Here, the image density control operation may be performed as follows.

The image forming apparatus 100 may form an image density pattern for electro-photography (EP) condition compensation. The image forming apparatus 100 may measure an image density of the formed image density pattern for EP condition compensation. Then, the image forming apparatus 100 may compensate an EP condition using the measured image density of the image density pattern for EP condition compensation. Here, the EP condition compensation may include at least one of electric charge voltage condition compensation, developing bias voltage condition compensation, or writing condition compensation.

When the EP condition compensation is performed, the image density may be controlled through adjusting an amount of toner attached to an organic photo conductor (OPC). However, although the EP condition compensation is performed, only a slope of the TRC is compensated, but the compensation in intermediate gradation of the TRC is not accurately performed. This is because the EP condition compensation only adjusts the amount of the toner attached to the OPC, but does not change a half-toning screen related to output/non-output of dots.

Since the image forming apparatus 100 represents an image by binary-levels having two states according to the output/non-output of the dots unlike an imaging apparatus which represents an image by multi-levels, the term "half-toning" means to convert an image represented by multi-levels into an image represented by binary-levels.

Further, the half-toning screen means a screen configured to convert a gradation value (0 to 255) of a pixel into a binary-level image.

On the other hand, there is a need for changing the half-toning screen to solve the problem for accuracy of compensation in the intermediate gradation of the TRC, which is caused in the EP condition compensation.

Therefore, the image forming apparatus 100 may form an image density pattern for tone compensation by reflecting an EP condition compensation result. The image forming apparatus 100 may measure an image density of the formed image density pattern for tone compensation. Then, the image forming apparatus 100 may transmit measured image density data of the image density pattern for tone compensation to the host apparatus 200 communicating with the image forming apparatus 100. The image density data for tone compensation is transmitted to the host apparatus 200 because the GDI type image forming apparatus 100 autonomously disables changing the half-toning screen. Therefore, image density data is transmitted to the host apparatus 200 to enable compensating the TRC, since the host apparatus 200 may generate binary printing data to which the half-toning screen is applied and transmit the binary printing data to the image forming apparatus 100.

The host apparatus 200 may thus receive the image density data of the image density pattern for tone compensation. The host apparatus 200 may calculate TRC data corresponding to the received image density data of the image density pattern for tone compensation. The host apparatus 200 may calculate TCC data for compensating the TRC data. Then, the host apparatus 200 may generate a half-toning screen corresponding to the calculated TCC data. The host apparatus 200 may generate binary printing data by applying the generated half-toning screen to a printing image according to a print command. The host apparatus 200 may transmit the generated binary printing data to the image forming apparatus 100.

Accordingly, the image forming apparatus 100 may perform an image forming job using the received binary printing data.

Therefore, the GDI type image forming apparatus may perform image density compensation of the intermediate gradation by calculating the TRC data and TCC data using the received image density data of the image density pattern for tone compensation in the host apparatus 200 and generating the half-toning screen using the calculated TRC data and TCC data in the host apparatus 200.

Figure 2:
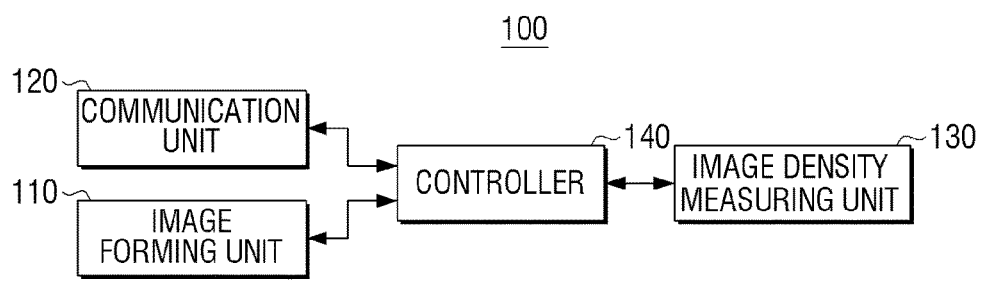
FIG. 2 is a block diagram illustrating an image forming apparatus according to an exemplary embodiment of the present general inventive concept.

FIG. 2 is a block diagram illustrating an image forming apparatus 100 according to an exemplary embodiment. Referring to FIG. 2, the image forming apparatus 100 partially or wholly includes an image forming unit 110, a communication unit 120, an image density measuring unit 130, and a controller 140. Here, the image forming apparatus 100 may be a GDI type image forming apparatus 100.

A color laser image forming apparatus, as an example of the image forming apparatus 100, prints an image through processes, that is, a charging process, a writing process, a developing process, a transferring operation, a fusing process, and the like. The charging process is a process of applying a high voltage (about 7000 V) to a charger and forming negative (−) charges on a surface of an OPC by a Corona discharge. The writing process is a process of scanning a laser beam to the surface of the OPC on which the negative (−) charges are formed and dissipating the negative (−) charges in the form of letters, thereby forming a latent image. The developing process is a process of causing toner particles having negative (−) components to be attached on a latent image portion of the surface of the OPC. The transferring process is a process of applying a predetermined transfer voltage to a transfer to form positive (+) charges on a rear surface of a paper when the paper passes between the OPC and the transfer unit and pulling the negative (−) toner particles formed on a surface of a drum toward the paper. The fusing processing is a process of fusing the toner formed on the paper by applying appropriate heat and pressure. An image is formed on the paper and is output through the above-described processes. Hereinafter, the image forming apparatus according to an exemplary embodiment will be described in more detail with reference to the above-described operation.

The image forming unit 110 performs an image forming job including the above-described charging, writing, developing, transferring, fusing, and the like. To perform the image forming job, the image forming unit 110 may include a paper feeding unit configured to feed a printing paper, a charger configured to perform a charging job, a laser configured to perform a writing job, C, M, Y, and K developers configured to perform developing jobs, an OPC onto which an printing image is developed, a transfer unit configured to perform a transferring job, a fuser configured to perform a fusing job, and a paper discharging unit configured to discharge the printing paper.

Accordingly, the image forming unit 110 may form an image density pattern for EP condition compensation. The laser may form an electrostatic latent image corresponding to the image density pattern for EP condition compensation on the OPC, and the C, M, Y, and K developers may develop the image density pattern for EP condition compensation on the formed electrostatic latent image. Further, the transfer unit may transfer the image density pattern for EP condition compensation on the intermediate transfer belt. Thus, the image forming unit 110 may form the image density pattern for EP condition compensation.

The image density pattern for EP condition compensation may include a yellow (Y) image density pattern, a magenta (M) image density pattern, a cyan (C) image density pattern, and a black (K) image density pattern. Each of the Y, M, C, and K image density patterns may be divided into several steps according to a toner area coverage (TAC). However, the EP condition compensation may be performed on a slope of the TRC on characteristics thereof, and the compensation in the intermediate gradation of the TRC might not be accurately performed. Thus, the EP condition compensation is not used to perform the image density compensation in the intermediate gradation. Hereinafter, for clarity, an example in which the K image density pattern is formed will be described.

When an input gradation corresponding to an image density of a tenth step of K image density pattern among a plurality of K image density patterns is 255 and an output gradation corresponding to a measured image density of the tenth step of image density pattern is 200, the EP condition compensation is used to compensate the output gradation corresponding to the image density of the tenth step of K image density pattern into 255. The image density pattern for EP condition compensation need not include the entire TAC, but may be formed to include less than five steps for each color, for example, such as an image density pattern of 100% coverage image density to an image density pattern of 50% coverage image density.

The image forming unit 110 may form an image pattern for tone compensation. The laser may form an electrostatic latent image corresponding to the image density pattern for tone compensation on the OPC, and the C, M, Y, and K developers may develop the image density pattern for tone compensation on the formed electrostatic latent image. Further, the transfer unit may transfer the image density pattern for tone compensation on the intermediate transfer belt. Thus, the image forming unit 110 may form the image density pattern for tone compensation.

The image density pattern for tone compensation may include a yellow (Y) image density pattern, a magenta (M) image density pattern, a cyan (C) image density pattern, and a black (K) image density pattern. Each of the Y, M, C, and K image density patterns may be divided into several steps according to a TAC. The image density pattern for tone compensation may be formed to include a number of steps (levels), for example, ten steps or more for each color from an image density pattern of 0% coverage image density to an image density pattern of 100% coverage image density on characteristic of gradation compensation. This is because the tone compensation may be performed on the image density through changing of a half-toning screen and thus the image density for all gradation may be accurately compensated, unlike the EP condition compensation.

Images for forming the image density pattern for EP condition compensation and the image density pattern for tone compensation may have been previously stored in the image forming apparatus 100 or may be received from the host apparatus 200.

The communication unit 120 may be formed to connect the image forming apparatus 100 and the host apparatus 200. The communication unit 120 may connect the image forming apparatus 100 and the host apparatus 200, for example, through a local area network (LAN) and an Internet network in a wireless or wired manner or through a universal serial bus (USB) port.

The image density measuring unit 130 may measure an image density of the formed image density pattern. The image density measuring unit 130 may measure an image density of the image density pattern for electroluminescence (EL) condition compensation and an image density of the image density pattern for tone compensation.

The image density measuring unit 130 may be implemented with an image density (ID) sensor including a light emitting unit configured to radiate light to the image density pattern and a light receiving unit configured to receive light reflected from the image density pattern. When the light reflected from the image density pattern is input to the light receiving unit, the ID sensor may output an electrical signal corresponding to an intensity of the input light. Further, the ID sensor may convert the generated electrical signal into a digital signal using an analog to digital converter (ADC) and output the converted digital signal. The output signal from the ID sensor may be transmitted to the controller 140.

On the other hand, the image density measuring unit 130 may measure an image density of the image density pattern formed on the intermediate transfer belt or the OPC.

One or more image density measuring unit 130 may be included in the image forming apparatus 100 according to the type of the image forming apparatus 100. For example, the multipath type image forming apparatus 100 may include only one image density measuring unit 130. The single path type image forming apparatus 100 may include four image density measuring units.

The controller 140 may control an overall operation of the image forming apparatus 100. The controller 140 may partially or wholly control the image forming unit 110, the communication unit 120, and the image density measuring unit 130.

The controller 140 may perform an image density control operation at a specific point in time. That is, the image density may change due to several factors, for example, changes in environments such as temperature or humidity, changes over time in consumables including developers, and changes in development-related voltages. Therefore, there is a need to suitably control the image density by measuring the image density periodically or at a specific point of time. Therefore, the image forming apparatus may autonomously determine a periodic point in time (for example, whenever printing papers of 100 pieces are printed) or a specific point in time (for example, when power is turned on) to perform an image density control operation. Alternatively, when the host apparatus 200 orders the image forming apparatus 100 to perform the image density control operation, the controller 140 may perform the image density control operation.

The image density control operation may be performed as follows.

The controller 140 may control the image forming unit 130 to form an image density pattern for EP condition compensation. When the image density measuring unit 130 outputs a signal corresponding to an image density of the image density pattern for EP condition compensation, the controller 140 may receive the output signal. The controller 140 may compare the image density of the image density pattern for EP condition compensation with a preset reference TRC image density and compensate at least one of an electric charge voltage condition, a developing bias voltage condition, or a writing condition so that the image density of the image density pattern for EP condition compensation comes close to the preset reference TRC image density.

Further, the controller 140 may control the image forming unit 110 to form an image density pattern for tone compensation. The image density pattern for tone compensation may be formed by reflecting an EP condition compensation result. When the image density measuring unit 130 outputs a signal corresponding to the image density of the image density pattern for tone compensation, the controller 140 may receive the output signal. The controller 140 may generate image density data of the image density pattern for EP condition compensation using the received signal. Further, the controller 140 may control the communication unit 120 to transmit generated image density data to the host apparatus 200.

When the host apparatus 200 generates tone-compensated binary printing data based on the image density data transmitted from the image forming apparatus 100 and the image forming apparatus 100 receives the binary printing data through the communication unit 120 from the host apparatus 200, the controller 140 may control the image forming apparatus 110 to perform image forming job using the received binary printing data.

Figure 3:
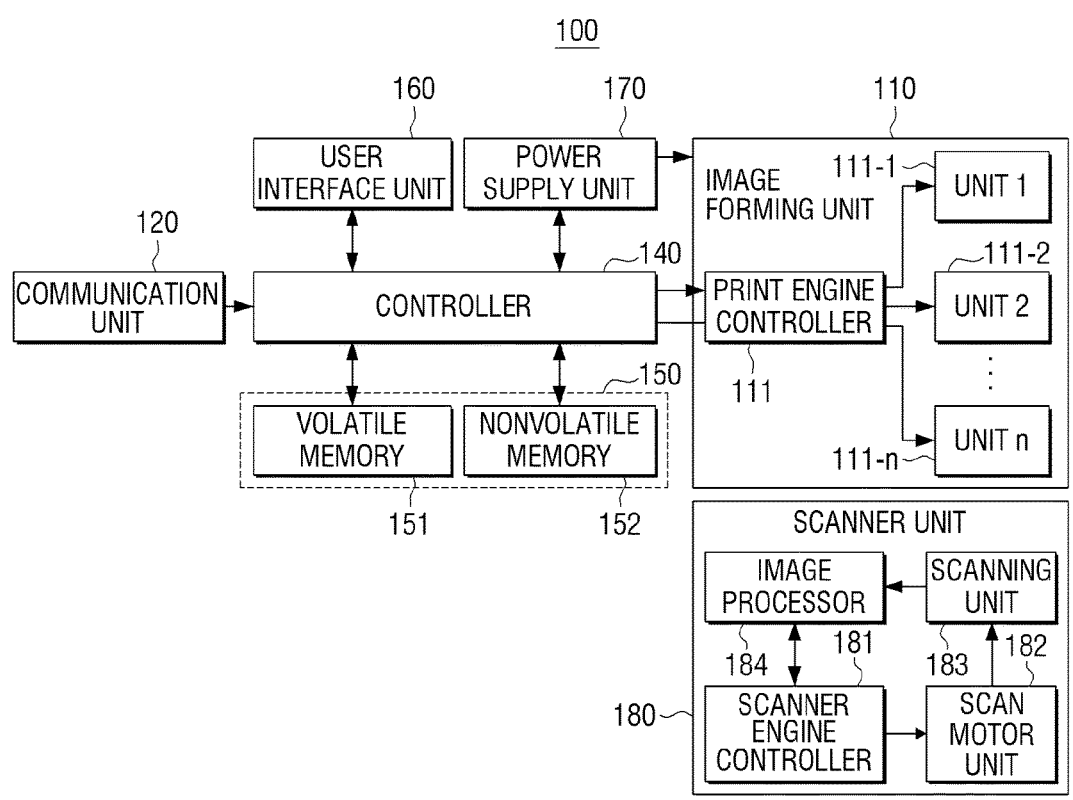
FIG. 3 is a block diagram illustrating the image forming apparatus of FIG. 2.

FIG. 3 is a block diagram illustrating the image forming apparatus 100 of FIG. 2. Referring to FIG. 2, the image forming apparatus 100 may partially or wholly include an image forming unit 110, a communication unit 120, a controller 140, a storage unit 150, a user interface unit 160, a power supply unit 170, and a scanner unit 180. Detailed description of components of FIG. 3 which have been previously described in FIG. 2 will be omitted and only detailed description of other components of FIG. 3 will be made. Further, the configuration of FIG. 3 illustrates an MFP configured to perform at least two functions among a printing function, a scanning function, a copying function, and a facsimile function. When the image forming apparatus of FIG. 3 is a simple printer, some components, for example, the scanner unit 180, may be omitted. Further, other components (not shown), such as a bus configured to exchange data between the components and a buffer configured to temporarily store data, may be further added.

The user interface unit 160 is configured to receive various kinds of commands from a user. The user interface unit 160 may include a display panel and at least one button. The display panel may be implemented with a touch screen. The user interface unit 160 may provide various types of user interface (UI) screens and the user may input commands by directly toughing the UI screen or by operating the button provided in the user interface unit 160. The command may be a command for setting various functions provided in the image forming apparatus or a command for setting mode change, operation stop, and/or operation restart. Specifically, the command may include a command for executing an image density control operation.

The power supply unit 170 serves to supply power to the respective components in the image forming apparatus 100. Specifically, the power supply unit may receive alternative current (AC) power from the outside, convert the AC power into direct current (DC) power having potential levels suitable for the respective components using elements such as a transformer, an inverter, and a rectifier, and output the DC power.

The controller 140 may perform the functions described in FIG. 2. Further, the controller 140 may control the image forming apparatus according to data and a command from an external device connected through the communication unit 120, a user command input through the user interface unit 160, and the like. That is, since the image forming apparatus 100 according to an exemplary embodiment has the GDI type, a printer driver installed in the host apparatus 200 may generate a GDI language in which the printing data is converted into the binary printing data and transmit the generated GDI language to the image forming apparatus 100. At this time, the controller 140 may control the image forming unit 110 to emulate the received GDI language using a GDI emulator and perform a printing job.

The image forming unit 110 may include a print engine controller 111, and a plurality of units (111-1 to 111-*n*) used for an image forming job. Here, the plurality of units (111-1 to 111-*n*) may include a paper feeding unit, a charger, a laser, an OPC, a plurality of developers, a transfer unit, a paper discharging unit, an image density measuring unit (see 130 of FIG. 13), and the like. The print engine controller 111 may control the plurality of units (111-1 to 111-*n*) and perform the image forming job under control of the controller 140.

On the other hand, when a scan command is input through the user interface unit 160, the controller 140 may control the scanner unit 180 to perform a scanning job.

The scanner unit 180 may include a scanner engine controller 181, a scan motor unit 182, a scanning unit 183, and an image processor 184.

The scanner engine controller 181 communicates with the controller 140 and controls the respective components of the scanner unit 180 to perform the scanning job.

The scanning unit 183 servers to scan an object. The scanning unit 183 may include an image reading sensor, a lens, a light source, and the like. The image reading sensor may comprise, for example, a charge coupled device (CCD) image sensor or a complementary metal oxide semiconductor (CMOS) image sensor (CIS). The image reading sensor may include a photoelectric converter (not shown) configured to absorb reflected light of light, which is generated from the light source and radiated to the object, and generate charges, as well as a signal detector (not shown) configured to detect the charges generated in the photoelectric converter and convert the detected charges into an electric signal, and the like. The electric signal converted in the signal detector may be provided to the image processor 184.

The image processor 184 performs processing on image data input from the scanning unit 183, such as shading and comma correction, dot per inch (DPI) conversion, edge emphasis, error diffusion, and scaling and generate scanning data. The image processor 184 may appropriately perform the processing by considering a predetermined resolution, a scan mode, a scan area, zoom in/out ratio, and the like.

The scan motor unit 182 moves the scanning unit 183 or a paper and causes scanning for an entire object to be performed. That is, the scan motor unit 182 moves different media according to whether an operation type of a scanner is a sheet-feed type or a flat-bed type. For example, while the scan motor 182 moves the paper in the sheet-feed type scanner, the scan motor unit 182 moves the scanning unit 183 in the flat-bed type scanner. The scan motor unit 182 may be implemented with, for example, a carriage return motor, and the like.

The scanner engine controller 181 drives the scanning unit 183 and the scan motor unit 182 to scan the object and controls the image processor 184 to generate scanning data when a scan command is transmitted from the controller 140.

The storage unit 150 is configured to store various types of information, such as a specification of the image forming apparatus, a using state, printing data, scanning data, pre-processed data, printing history information, and various kinds of application programs and operating system (OS) used in the image forming apparatus. The storage unit may be configured to have a volatile memory 151 and a nonvolatile memory 152.

The volatile memory 151 may be used as a temporary storage space required for operation. That is, the volatile memory 151 may be implemented so that printing data, pre-scanning data, and data scanned for copy transmitted from a host personal computer (PC), and the like are temporarily stored therein and after a corresponding job is completed, the data is erased therefrom. Various data or programs may be permanently stored in the nonvolatile memory 152. FIG. 3 has illustrated one volatile memory 151 and one nonvolatile memory 152, but the number of volatile memories 151 and the number of nonvolatile memories 152 and sizes thereof may be variously designed to be suitable for characteristics of the image forming apparatus 100.

Figure 4:
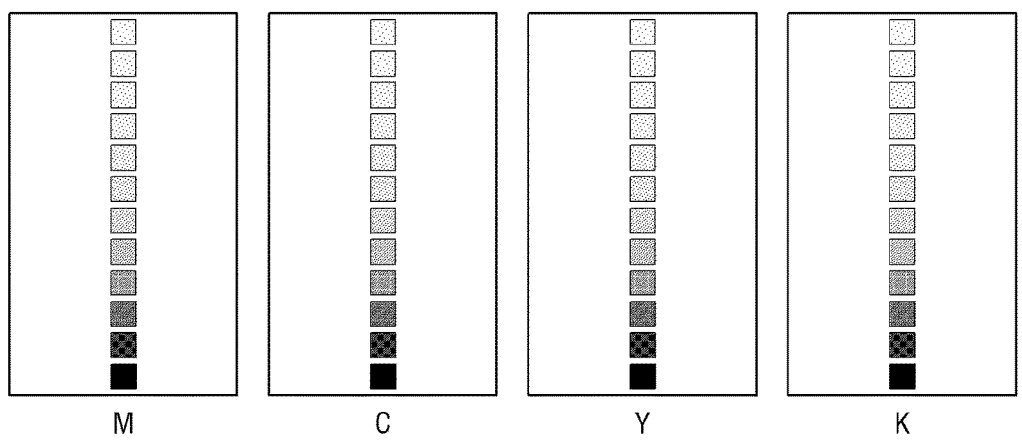
FIG. 4 is a view illustrating an image density pattern according to an exemplary embodiment of the present general inventive concept.

FIG. 4 is a view illustrating an image density pattern according to an exemplary embodiment. Referring to FIG. 4, the image density pattern for EP condition compensation and the image density pattern for tone compensation may each include a Y image density pattern, an M image density pattern, a C image density pattern, and a K image density pattern. Each of the Y, M, C, and K image density patterns may be divided into several steps according to a TAC.

FIG. 4 has illustrated that each of the Y, M, C, and K image density patterns is divided into a number of steps (levels), for example, twelve steps, but it is not limited thereto. That is, as described above, the image density pattern for EP condition compensation may be formed to include less than five steps for each color, for example, such as an image density pattern of 100% coverage image density to an image density pattern of 50% coverage image density. The image density pattern for tone compensation may be formed to include ten steps or more for each color from an image density pattern of 0% coverage image density to an image density pattern of 100% coverage image density.

Figure 5:
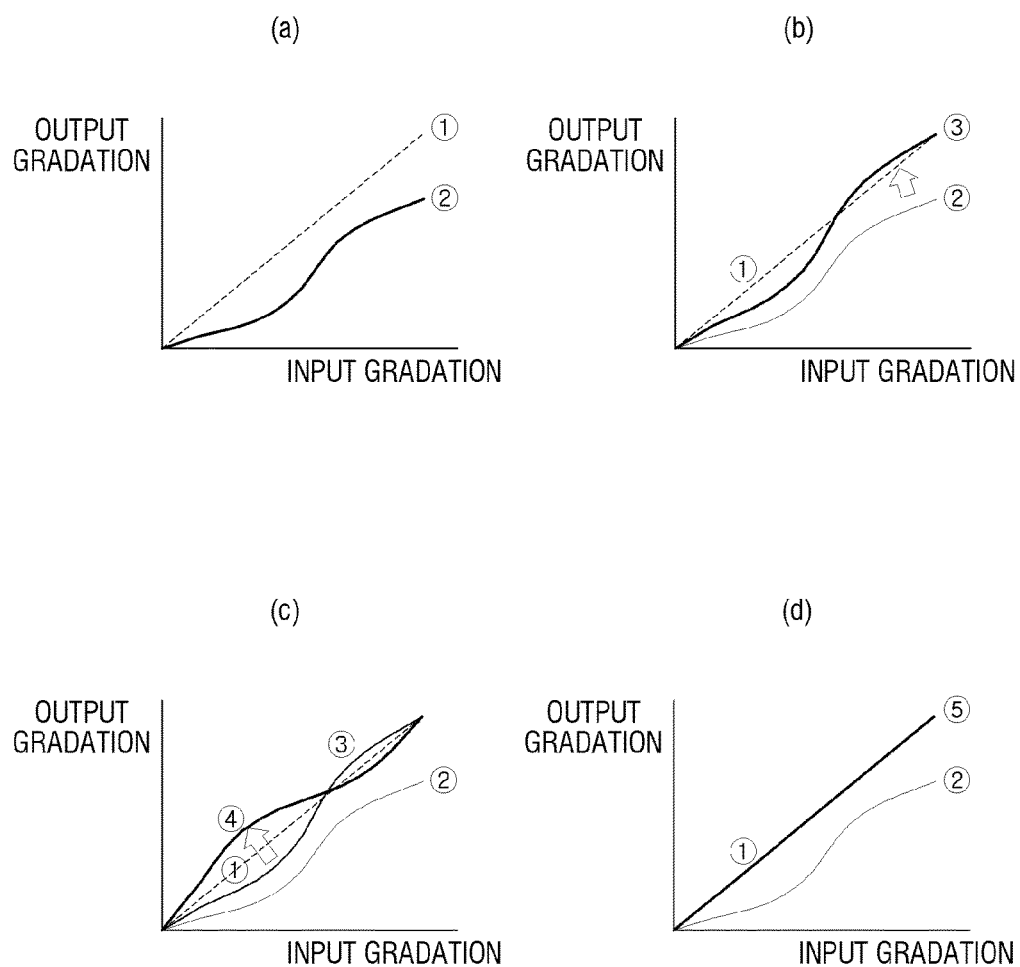
FIG. 5 is a view illustrating a change of a TRC according to an image density control method according to an exemplary embodiment of the present general inventive concept.

FIG. 5 is a view illustrating change of a TRC according to an image density control operation according to an exemplary embodiment. In FIG. 5, FIG. 5(*a*) shows a TRC before the image density control operation, FIG. 5(*b*) shows a TRC after EP condition compensation, FIG. 5(*c*) shows a TCC for compensating a TRC according to EP condition compensation, and FIG. 5(*d*) shows a TRC after EP condition compensation and tone compensation.

Referring to FIG. 5(*a*), a target TRC 1 in which an input gradation is equal to an output gradation and a TRC 2 before the image density control operation are included. That is, it can be seen from FIG. 5(*a*) that the target TRC is greatly different from the TRC before the image density control operation.

Referring to FIG. 5(*b*), a TRC 3 after EP condition compensation is further included. That is, it can be seen in FIG. 5(*b*) that even when the EP condition compensation is performed, only a slope of the TRC is compensated, but compensation in the intermediate gradation of the TRC is not performed. This is because the EP condition compensation adjusts only an amount of toner attached on a surface of an OPC, but does not change a half-toning screen related to output/non-output of dots.

Referring to FIG. 5(*c*), a TCC 4 for compensating a TRC according to EP condition compensation is further included. That is, it can be seen from FIG. 5(*c*) that the TCC is calculated for the TRC according to the EP condition compensation by considering the target TRC. Further, it can be seen that the tone compensation is performed using the calculated TCC.

Referring to FIG. 5(*d*), a TRC 5 after the EP condition compensation and the tone compensation is further included. That is, it can be seen from FIG. 5(*d*) that the calculated TRC is the same as the target TRC after the EP condition compensation and the tone compensation are performed. In other words, after the EP condition compensation and the tone compensation are performed, the calculated TRC is accurately compensated in the entire gradation. This is because the tone compensation changes the half-toning screen related to output/non-output of dots.

Figure 6:
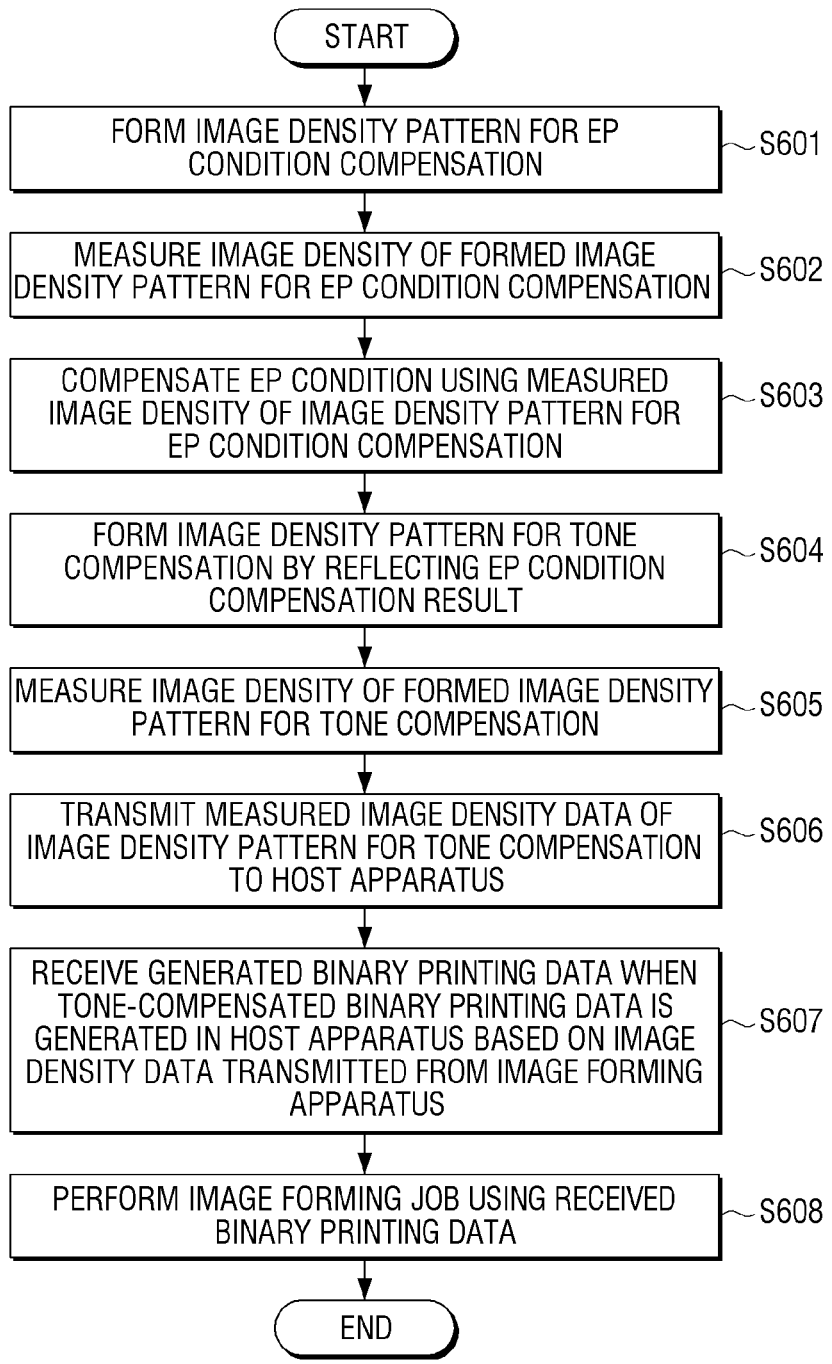
FIG. 6 is a flowchart illustrating an image forming method of an image forming apparatus according to an exemplary embodiment of the present general inventive concept.

FIG. 6 is a flowchart illustrating an image forming method of an image forming apparatus according to an exemplary embodiment. Referring to FIG. 6, first, the image forming apparatus forms an image density pattern for EP condition compensation at operation S601. The image forming apparatus then measures an image density of the formed image density pattern for EP condition compensation at operation S602. Next, the image forming apparatus 100 compensates an EP condition using the measured image density of the image density pattern for EP condition compensation at operation S603. Here, the EP condition compensation may include at least one of electric charge voltage condition compensation, developing bias voltage condition compensation, and/or writing condition compensation. The operation S603 of compensating an EP condition may include comparing the measured image density of the image density pattern for EP condition compensation and a preset reference image intensity and compensating at least one of an electric charge voltage condition, a developing bias voltage condition, and a writing condition using a comparison result.

The image forming apparatus may form an image density pattern for tone compensation by reflecting an EP condition compensation result at operation S604. The image forming apparatus measures an image density of the formed image density pattern for tone compensation at operation S605. Next, the image forming apparatus transmits measured image density data of the image density pattern for tone compensation to the host apparatus 200 communicating with the image forming apparatus 100 at operation S606.

When tone-compensated binary printing data is generated based on the image density data transmitted from the image forming apparatus in the host apparatuses, the image forming apparatus receives the generated binary printing data from the host apparatus at operation S607.

The image forming apparatus performs an image forming job using the received binary printing data at operation S608.

The image density pattern for EP condition compensation and the image density pattern for tone compensation may each include a Y image density pattern, an M image density pattern, a C image density pattern, and a K image density pattern.

Each of the operation S602 of measuring an image density of the formed image density pattern for EP condition compensation and the operation S605 of measuring an image density of the formed image density pattern for tone compensation may include measuring the image density of the image density pattern formed on an intermediate transfer belt using an ID sensor.

Figure 7:
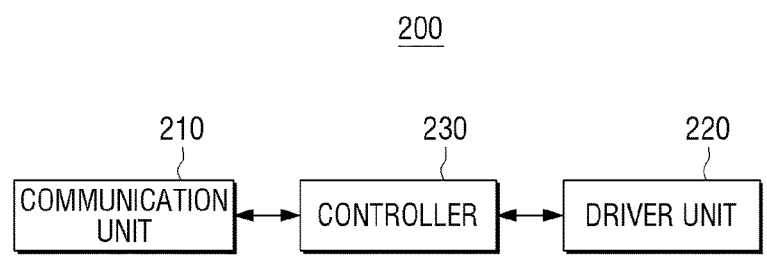
FIG. 7 is a block diagram illustrating a host apparatus according to an exemplary embodiment of the present general inventive concept.

FIG. 7 is a block diagram illustrating a host apparatus according to an exemplary embodiment. Referring to FIG. 7, a host apparatus 200 partially or wholly includes a communication unit 210, a driver unit 220, and a controller 230.

The communication unit 210 performs a function for connecting the host apparatus 200 to the image forming apparatus 100. In particular, the communication unit 210 may receive image density data of an image density pattern for tone compensation transmitted from the image forming apparatus 100. Further, the communication unit 210 may transmit binary printing data generated in the host apparatus to the image forming apparatus 100. The communication unit 210 may connect the host apparatus 200 to the image forming apparatus 100, for example, through a LAN or an Internet communication network in a wireless manner or through a wired manner, e.g., using a USB port.

The driver unit 220 may convert a printing image according to a print command into a GDI language when the print command is received from the user. The printing image may be a multilevel image color-converted in C, M, Y, and K colors.

Specifically, the driver unit 220 may calculate TRC data corresponding to image density data of the image density pattern for tone compensation. Further, the driver unit 220 may calculate TCC data for compensating the calculated TRC data. The TCC data may be an inverse function of the TRC data. This is because in an ideal case, an input gradation of the TRC is the same as an output gradation of the TRC. For example, when the input gradation is 125, the output gradation should ideally be 125, thereby matching the input gradation.

The driver 220 generates a half-toning screen corresponding to the calculated TCC data. Thus, the driver unit 220 may generate binary printing data by applying the generated half-toning screen to the printing image according to the print command. The driver unit 220 may transmit the generated binary printing data to the image forming apparatus in a GDI language type.

The driver unit 220 may smooth the TRC data and calculate TCC data using the smoothed TRC data. Through the smoothing, noise may be removed from the TRC data.

Further, the driver 220 may perform interpolation on the TRC data and calculate the TCC data using the interpolated TRC data. The interpolation enables increased resolution of the TRC data, and thus increased resolution of the half-toning screen corresponding to the TCC data.

The driver unit 220 may apply at least one of the smoothing and the interpolation to the TRC data regardless of an order and calculate the TCC data using an output result.

Figure 8:
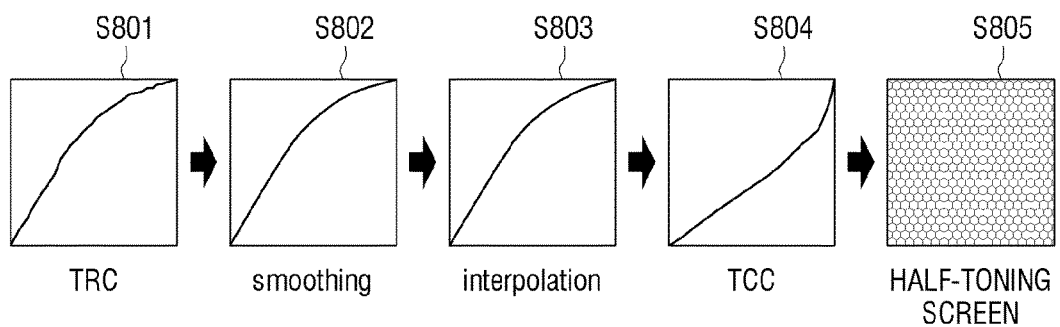
FIG. 8 is a view illustrating a half-toning screen generating method according to an exemplary embodiment of the present general inventive concept.

The method of generating the half-toning screen will be described in more detail with reference to FIG. 8. Referring to FIG. 8, the host apparatus 200 may receive image density data of an image density pattern for tone compensation and calculate TRC data indicating a relationship between an input gradation and an output gradation (operation S801). The host apparatus 200 may perform a smoothing operation to remove noise from the calculated TRC data (operation S802). The host apparatus 200 may perform interpolation to increase a resolution of the smoothed TRC data (operation S803). The host apparatus 200 may generate TCC data for compensating the interpolated TRC data (operation S804). The host apparatus 200 may generate a half-toning screen corresponding to the TCC data (operation S805).

The controller 230 controls an overall operation of the host apparatus 200. Specifically, the controller 230 may partially or wholly control the communication unit 210 and the driver unit 220.

The controller 230 may control the image forming apparatus to perform an image density control operation at a specific point in time.

The controller 230 may control the communication unit 210 to transmit the binary printing data generated in the driver unit 220 to the image forming apparatus 100 when the print command is received.

FIG. 9 is a view illustrating an image-forming control method of a host apparatus according to an exemplary embodiment. Referring to FIG. 9, first, the host apparatus receives image density data of an image density pattern for tone compensation from the image forming apparatus (operation S901). The host apparatus calculates TRC data using the received image density data of the image density pattern for the tone compensation (operation S902). The host apparatus calculates TCC data for compensating the calculated TRC data (operation S903). The host apparatus generates a half-toning screen corresponding to the calculated TCC data (operation S904). The host apparatus generates binary printing data by applying the generated half-toning data to a printing image according to a print command (operation S905). The host apparatus transmits the generated binary printing data to the image forming apparatus (operation S906).

The image-forming control method of the host apparatus according to an exemplary embodiment may further include a smoothing operation on the calculated TRC data. The calculating operation S903 may calculate the TCC data using the smoothed TRC data.

The image-forming control method of the host apparatus according to an exemplary embodiment may further include performing interpolation on the calculated TRC data. In this case, the calculating operation S903 may calculate the TCC data using the interpolated TRC data.

The above-described methods according to the exemplary embodiments may be implemented with a program code and the program code may be stored in various non-transitory computer-readable media and provided to servers or apparatuses.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory device, a read-only memory (ROM), a random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the above-described exemplary embodiments, compensation for an image density of an intermediate gradation is performed in a GDI type image forming apparatus and thus best color printing quality is obtained.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming method of a graphic device interface (GDI) type image forming apparatus, comprising:
    to perform an image forming job for an external apparatus communicatively coupled to the GDI type image forming apparatus,
        forming an image density pattern for a tone compensation, in response to receiving an image density control command from the external apparatus;
        measuring an image density of the formed image density pattern for the tone compensation to generate measured image density data for the tone compensation;
        transmitting the measured image density data for the tone compensation to the external apparatus to control the external apparatus to
            change a half-toning screen to be applied to the image forming job to correspond to the measured image density data for the tone compensation by calculating tone reproduction curve (TRC) data corresponding to the measured image density data for the tone compensation,
            calculating tone compensation curve (TCC) data for compensating the calculated TRC data, and generating a half-toning screen corresponding to the calculated TCC data,
            generating binary data for performing the image forming job, by applying the generated half-toning screen corresponding to the calculated TCC data to the binary data, and
            transmitting the generated binary data, to which the generated half-toning screen corresponding to the calculated TCC is applied, to the GDI type image forming apparatus; and
        receiving the transmitted binary data for performing the image forming job, to which the half-toning screen corresponding to the calculated TCC is applied by the external apparatus.

2. The method as claimed in claim 1, further comprising:
    performing the image forming job using the received binary data, to which the half-toning screen corresponding to the calculated TCC is applied.

3. The method as claimed in claim 1, further comprising:
    forming an image density pattern for electro-photography (EP) condition compensation;
    measuring an image density of the formed image density pattern for the EP condition compensation; and
    compensating an EP condition using the measured image density of the formed image density pattern for the EP condition compensation,
        wherein the formed image density pattern for the tone compensation is formed based on a result of the EP condition compensation.

4. The method as claimed in claim 3, wherein each of the formed image density pattern for the tone compensation and the formed image density pattern for the EP condition compensation includes an image density pattern of yellow (Y), an image density pattern of magenta (M), an image density pattern of cyan (C), and an image density pattern of black (K).

5. The method as claimed in claim 3, wherein the formed image density pattern for the tone compensation and the formed image density pattern for the EP condition compensation are both formed in an intermediate transfer belt, and
    the image density of the formed image density pattern for the tone compensation and the image density of the formed image density pattern for the EP condition compensation both formed in the intermediate transfer belt are measured therein.

6. The method as claimed in claim 3, wherein the compensating an EP condition includes:
    comparing the measured image density of the formed image density pattern for the EP condition compensation with a preset reference image density; and
    compensating at least one of an electric charge voltage condition, a developing bias voltage condition, or a writing condition using a result of the comparing the measured image density of the formed image density pattern for the EP condition compensation with the preset reference image density.

7. A non-transitory computer-readable medium to contain computer-readable codes as a program to execute the method of claim 1.

8. An image-forming control method of an external apparatus communicating with a graphic device interface (GDI) type image forming apparatus, the method of the external apparatus comprising:
    to perform an image forming job for the external apparatus communicatively coupled to the GDI type image forming apparatus,
        transmitting an image density control command to the GDI type image forming apparatus, for the GDI type image forming apparatus to form an image density pattern for a tone compensation, measure an image density of the formed image density pattern to generate measured image density data for the tone compensation, and transmit the measured image density data to the external apparatus;
        receiving the measured image density data for the tone compensation from the GDI type image forming apparatus;
        changing a half-toning screen to be applied to the image forming job to correspond to the measured image density data for the tone compensation by calculating tone reproduction curve (TRC) data corresponding to the measured image density data for the tone compensation,
            calculating tone compensation curve (TCC) data for compensating the calculated TRC data, and generating a half-toning screen corresponding to the calculated TCC data;
        generating the binary data for performing the image forming job, by applying the generated half-toning screen corresponding to the calculated TCC data to the binary data; and
        transmitting the generated binary data, to which the generated half-toning screen corresponding to the calculated TCC data is applied, to the GDI type image forming apparatus.

9. A graphic device interface (GDI) type image forming apparatus comprising:
    a communication unit to receive an image density control command from an external apparatus communicatively coupled to the GDI type forming apparatus;

an image forming unit to form an image density pattern for a tone compensation, in response to the communication unit receiving the image density control command from the external apparatus;

an image density measuring unit to measure an image density of the formed image density pattern for the tone compensation to generate measured image density data for the tone compensation; and a controller to control the communication unit to transmit the measured image density data for the tone compensation to the external apparatus to control the external apparatus to change a half-toning screen to be applied to an image forming job to correspond to the measured image density data for the tone compensation by calculating tone reproduction curve (TRC) data corresponding to the measured image density data for the tone compensation, calculating tone compensation curve (TCC) data for compensating the calculated TRC data, and generating a half-toning screen corresponding to the calculated TCC data, generating binary data for performing the image forming job, by applying the generated half-toning screen corresponding to the calculated TCC data to the binary data, and transmitting the generated binary data, to which the generated half-toning screen corresponding to the calculated TCC is applied, to the GDI type image forming apparatus;

control the communication unit to receive the transmitted binary data for performing the image forming job, to which the half-toning screen corresponding to the calculated TCC is applied by the external apparatus; and control the image forming unit to perform an image forming job using the received binary data.

10. The GDI type image forming apparatus as claimed in claim 9, wherein the image forming unit is to form an image density pattern for electro-photography (EP) condition compensation, the image density measuring unit is to measure an image density of the formed image density pattern for the EP condition compensation, the controller is to compensate an EP condition using the measured image density of the formed image density pattern for the EP condition compensation, and the image forming unit is to form the image density pattern for the tone compensation based on a result of the EP condition compensation.

11. The GDI type image forming apparatus as claimed in claim 10, wherein each of the formed image density pattern for the tone compensation and the formed image density pattern for the EP condition compensation includes an image density pattern of yellow (Y), an image density pattern of magenta (M), an image density pattern of cyan (C), and an image density pattern of black (K).

12. The GDI type image forming apparatus as claimed in claim 10, wherein the controller is to compare the measured image density of the formed image density pattern for the EP condition compensation with a preset reference image density and compensates at least one of an electric charge voltage condition, a developing bias voltage condition, or a writing condition using a comparison result.

13. The GDI type image forming apparatus as claimed in claim 9, wherein the image forming unit is to form the image density pattern for the tone compensation in an intermediate transfer belt;

the image density measuring unit is to measure the image density of the image density pattern formed in the intermediate transfer belt using an image density sensor.

14. A host apparatus which communicates with a graphic device interface (GDI) type image forming apparatus, the host apparatus comprising:

a communication unit to transmit an image density control command to the GDI type image forming apparatus, for the GDI type image forming apparatus to form an image density pattern for a tone compensation, measure an image density of the formed image density pattern to generate measured image density data for the tone compensation, and transmit the measured image density data to the host apparatus, and receive the measured image density data of the image density pattern for the tone compensation from the GDI type image forming apparatus;

a driver to change a half-toning screen to be applied to an image forming job to correspond to the measured image density data for the tone compensation by calculating tone reproduction curve (TRC) data corresponding to the measured image density data for the tone compensation, calculating tone compensation curve (TCC) data for compensating the calculated TRC data, and generating a half-toning screen corresponding to the calculated TCC data, and generate binary data for performing the image forming job, by applying the generated half-toning screen corresponding to the calculated TCC data to the binary data; and a controller to control the communication unit to transmit the generated binary data, to which the generated half-toning screen corresponding to the calculated TCC data is applied, to the GDI type image forming apparatus.

15. An image forming method of an image forming system, the method comprising:

to perform an image forming job for an external apparatus communicatively coupled to an GDI type image forming apparatus, forming, by the GDI type image forming apparatus, an image density pattern for a tone compensation, in response to receiving an image density control command from an external host apparatus;

measuring, by the GDI type image forming apparatus, an image density of the formed image density pattern for the tone compensation to generate measured image density data for the tone compensation;

transmitting, by the GDI type image forming apparatus, the measured image density data of the formed image density pattern for the tone compensation to the external host apparatus;

changing, by the external apparatus, a half-toning screen to be applied to the image forming job to correspond to the measured image density data for the tone compensation by calculating tone reproduction curve (TRC) data corresponding to the measured image density data for the tone compensation, calculating tone compensation curve (TCC) data for compensating the calculated TRC data, and generating a half-toning screen corresponding to the calculated TCC data;

generating, by the external apparatus, binary data for performing the image forming job, by applying the generated half-toning screen corresponding to the calculated TCC data to the binary data;

transmitting, by the external apparatus, the generated binary data, to which the generated half-toning screen corresponding to the calculated TCC is applied, to the GDI type image forming apparatus; and performing, by the GDI type image forming apparatus, the image forming job using the transmitted binary data, to which the half-toning screen corresponding to the calculated TCC is applied by the external apparatus.

16. An image forming method of a graphic device interface (GDI) type image forming system, comprising:

to perform an image forming job for an external apparatus communicatively coupled to the GDI type image forming apparatus, transmitting, by the external apparatus, an image density control command to the GDI type image forming apparatus;

forming, by the GDI type image forming apparatus, an image density pattern for a tone compensation, in response to receiving the transmitted image density control command from the external apparatus;

measuring, by the GDI type image forming apparatus, an image density of the formed image density pattern for the tone compensation to generate measured image density data for the tone compensation;

transmitting, by the GDI type image forming apparatus, the measured image density data for the tone compensation to the external apparatus;

changing, by the external apparatus, a half-toning screen to be applied to the image forming job to correspond to the measured image density data for the tone compensation by calculating tone reproduction curve (TRC) data corresponding to the measured image density data for the tone compensation, calculating tone compensation curve (TCC) data for compensating the calculated TRC data, and generating a half-toning screen corresponding to the calculated TCC data;

generating, by the external apparatus, the binary data for performing the image forming job, by applying the generated half-toning screen corresponding to the calculated TCC data to the binary data;

transmitting, by the external apparatus, the generated binary data, to which the generated half-toning screen corresponding to the calculated TCC is applied, to the GDI type image forming apparatus; and performing, by the GDI type image forming apparatus, the image forming job using the received binary data, to which the half-toning screen corresponding to the calculated TCC is applied by the external apparatus.

* * * * *

UNITED STATES PATENT AND TRADEMARK OFFICE
CERTIFICATE OF CORRECTION

PATENT NO. : 10,013,225 B2  
APPLICATION NO. : 14/073108  
DATED : July 3, 2018  
INVENTOR(S) : Han-sang Oh Page 1 of 1

It is certified that error appears in the above-identified patent and that said Letters Patent is hereby corrected as shown below:

On the Title Page

In item (54), and in the Specification, Column 1, Line 3, Title, after "DATA" insert -- BY --.

Signed and Sealed this  
Eleventh Day of December, 2018

Andrei Iancu  
*Director of the United States Patent and Trademark Office*